(12) United States Patent
Dumov et al.

(10) Patent No.: US 7,957,297 B2
(45) Date of Patent: Jun. 7, 2011

(54) TERMINATION MESSAGE FOR WIRELESS WIDE AREA NETWORK ROUTERS

(75) Inventors: Leo Dumov, Cupertino, CA (US); Henry Vinton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 12/172,392

(22) Filed: Jul. 14, 2008

(65) Prior Publication Data

US 2010/0008218 A1 Jan. 14, 2010

(51) Int. Cl.
*H04J 1/16* (2006.01)
(52) U.S. Cl. .......................... 370/242; 370/312
(58) Field of Classification Search ............... None
See application file for complete search history.

(56) References Cited

U.S. PATENT DOCUMENTS

| | | | | |
|---|---|---|---|---|
| 7,302,352 | B2* | 11/2007 | Chuang | 702/58 |
| 2002/0194537 | A1* | 12/2002 | Ali | 714/25 |
| 2003/0035377 | A1* | 2/2003 | Ju | 370/245 |
| 2005/0012395 | A1* | 1/2005 | Eckroad et al. | 307/44 |
| 2005/0281269 | A1* | 12/2005 | Choi | 370/395.2 |
| 2007/0041436 | A1 | 2/2007 | Yang | |
| 2007/0064855 | A1 | 3/2007 | Yeh | |
| 2007/0147290 | A1* | 6/2007 | Dispensa et al. | 370/329 |
| 2008/0101278 | A1* | 5/2008 | Bengtsson et al. | 370/328 |

* cited by examiner

*Primary Examiner* — Seema Rao
*Assistant Examiner* — Jianye Wu
(74) *Attorney, Agent, or Firm* — Edell, Shapiro & Finnan, LLC

(57) ABSTRACT

A wireless router device is configured to detect a fault that would prohibit wireless communications between the router and a wireless wide area network. A message, referred to herein as a termination message, is then generated. The termination message contains information describing the fault and is configured to cause termination of wireless communication with the wireless wide area network. The wireless router than transmits the termination message to at least one base transceiver station that is part of the wireless wide area network. The base transceiver station is then able to assess and reallocate resources, including power management, based on the fault information contained in the received termination message.

23 Claims, 3 Drawing Sheets

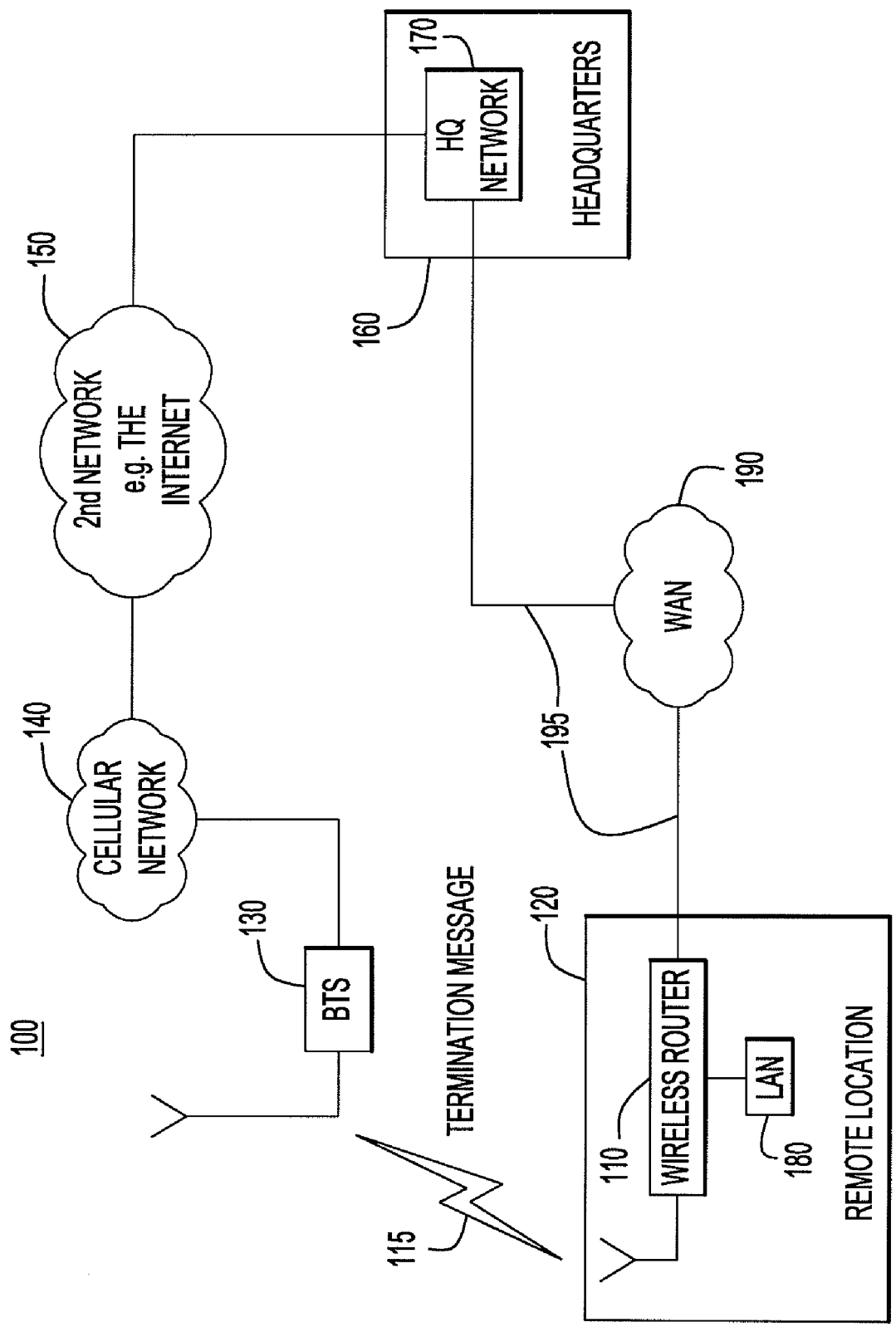

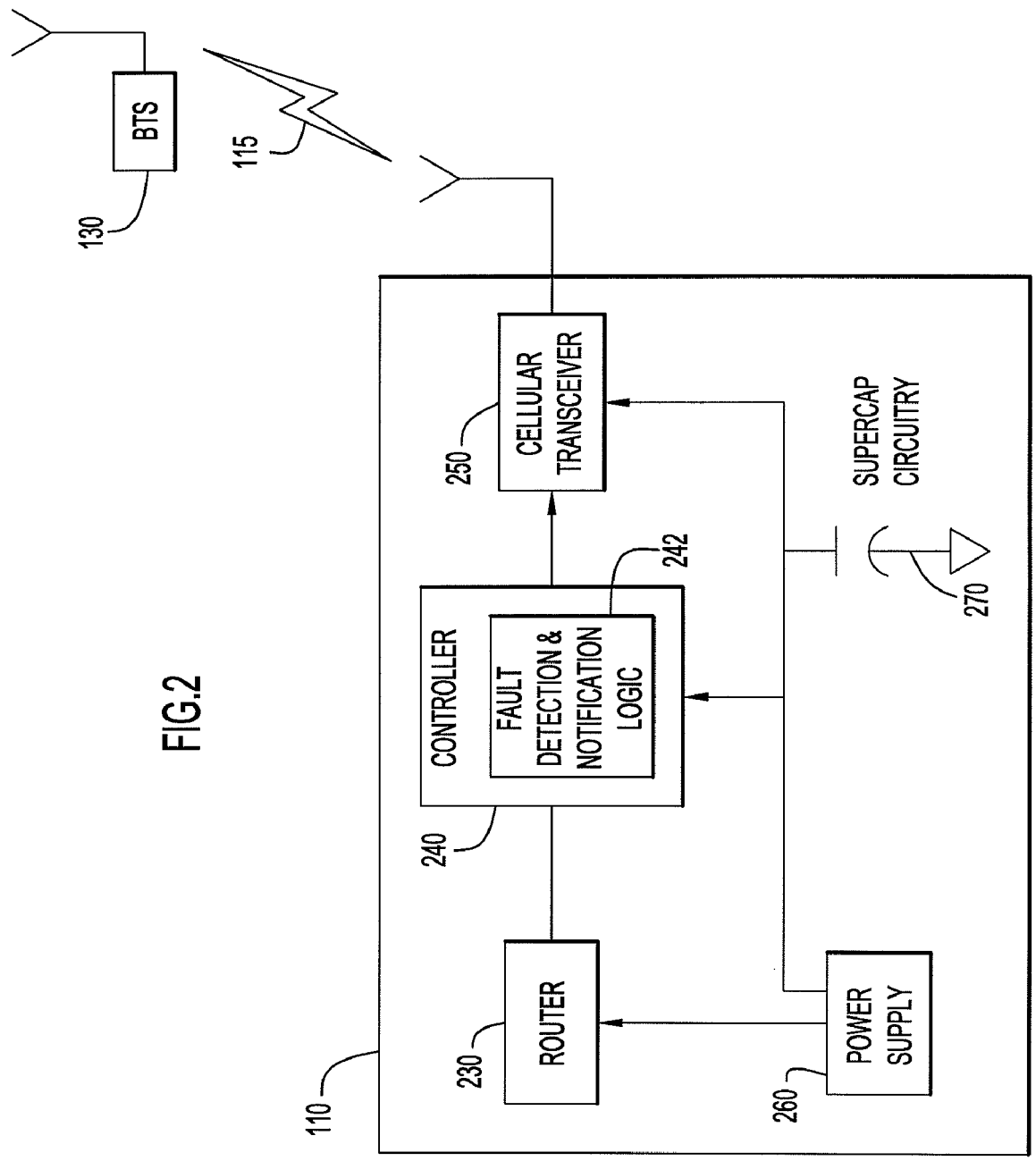

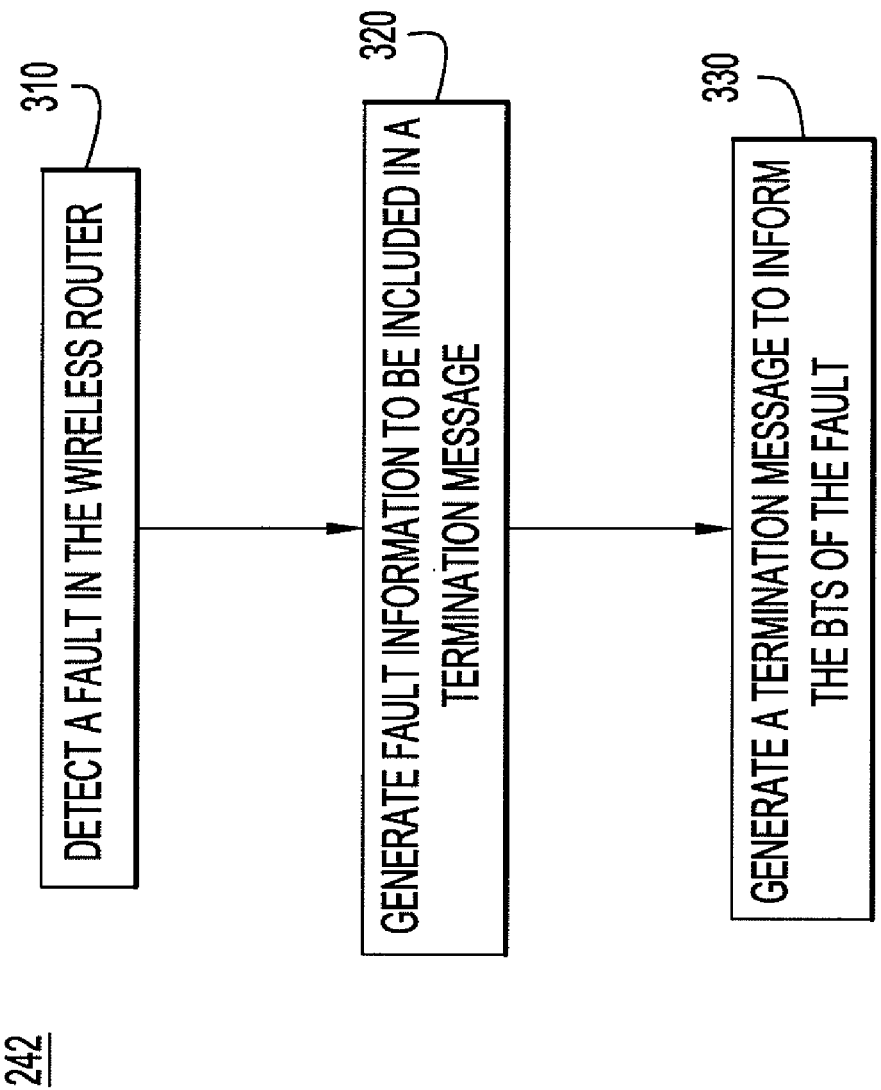

TERMINATION MESSAGE FOR WIRELESS WIDE AREA NETWORK ROUTERS

BACKGROUND

With the emergence of broadband cellular wireless services, mobile network operators now have the ability to address new market opportunities for data services. Unfortunately, these networks have evolved with "lightweight" mobile equipment in mind and not with the possibility of delivering full-featured wireline replacement services. For enterprise customers to adopt wireless wide area network (WWAN) technology, they need improved management capabilities and visibility to their network elements similar to the capabilities that they have in wireline networks.

Cellular networks are designed to handle situations where there is a temporary loss of connectivity with mobile equipment. With the integration of cellular communication capability into network routers for interface to a WAN, it is desirable to notify the cellular network when the network router experiences a fault, such as a power supply failure or software crash, and can no longer service the WWAN interface.

Mobile network operators offering data services to end customers need to manage base transceiver station resources efficiently when a wireless router is active on the mobile network. This is challenging because the on-demand nature of data services requires the base transceiver station to allocate resources for the wireless router even when data are not present or when the wireless router has failed. The base transceiver station cannot distinguish between a temporary loss of connectivity or wireless router failure, resulting in the wireless connection with the wireless router being kept open until a timeout occurs. In the absence of a notification and with the eventual loss of the cellular connection, the cellular network service provider and customer will not know why the connection to the router is lost and how to fix it.

BRIEF DESCRIPTION OF THE DRAWINGS

FIG. 1 is an example of a block diagram depicting a communication environment in which a wireless router is configured to transmit a termination message.

FIG. 2 is an example block diagram of the wireless router configured to transmit a termination message.

FIG. 3 is an example of a flow chart that depicts a process for generating a termination message in the wireless router.

DESCRIPTION OF EXAMPLE EMBODIMENTS

Overview

The techniques described herein add very simple logic/functionality to a wireless router to allow a base transceiver station in a wireless wide area network to reallocate resources when there is a fault in the wireless router that would prohibit wireless communications between the router and the wireless wide area network. Specifically, the wireless router device is configured to detect a fault that would prohibit wireless communications between the router and a wireless wide area network. A message, referred to herein as a termination message, is then generated. The termination message may contain information describing the fault and is configured to cause termination of wireless communication with the wireless wide area network. The wireless router then transmits the termination message to at least one base transceiver station that is part of the wireless wide area network. The base transceiver station is then able to assess and reallocate resources, including number of users it may serve, power management, etc., based on the fault information contained in the received termination message.

Referring first to FIG. 1, a wireless communication environment is shown at 100. The environment includes a remote location 120. The remote location 120 has a local area network (LAN) 180 for local users and a wireless router (WR) 110. The WR 110 facilitates communication with the remote location 120 and another facility, such as a headquarters 160 or home office (not shown). Communication between the remote location 120 and the headquarters 160 occurs through a wide area network 190 using a wireline connection 195, or through a wireless wide area network (WWAN) consisting of a base transceiver station (BTS) 130 and a cellular network 140 using a wireless communication link 115. A second network 150, e.g., the Internet, connects the cellular network 140 to a headquarters network 170 at the headquarters 160.

The remote location 120 is, for example, a retail kiosk (lottery machine, automated teller machine (ATM)), remote worksite, telemetry site, disaster recovery site, or the like. The WR 110 can be configured as primary source of communication when the WAN 190 is not present or as a backup to the WAN 190. When the WR 110 is used in a wireless mode, a wireless communication link 115 is established with the BTS 130.

According to the techniques described herein, if the WR 110 detects a fault in which wireless communication can no longer take place, then the WR 110 sends a termination message over wireless communication link 115 to the BTS 130. The BTS 130 can then disconnect the wireless communication link 115. The BTS can now reallocate its limited resources and inform the cellular network 140 and headquarters 160. Communication as used in this context is not meant to be limited data communications only. Communication can be data, signal, voice, or voice over data, such as voice over IP (VoIP). Although FIG. 1 depicts a cellular network, the drawings are to be considered in all respects illustrative and not meant to be limiting to any particular radio frequency cellular communications standard or protocol.

FIG. 2 illustrates one embodiment of the WR 110 in communication with a BTS 130. The WR 110 comprises a router 230, a controller 240 containing fault detection and notification logic 242, a cellular transceiver 250, a power supply 260 and super capacitor (supercap) circuitry 270. The router 230 is a network router that routes and forwards data on a LAN 180 and/or WAN 190. The controller 240 is a microprocessor, microcontroller, application-specific integrated circuit (ASIC), or other control device. The controller 240 may be embedded in the router 230 or transceiver 250, or reside separately. The cellular transceiver 250 comprises a radio transceiver and modem to support communication with the BTS 130. The power supply 260 provides primary power to all the components of WR 110. The supercap circuitry 270 provides a backup source of power to the controller 240 and the cellular transceiver 250.

The fault and notification logic 242 may be embodied as programmable logic in the form of software executed by a microprocessor 240 or as fixed logic as part of an ASIC implementation of the controller 240. The fault detection and notification logic 242 is configured to detect a hardware, firmware, or software fault in the router 230, or a problem with the power supply 260, and generate a termination message to be sent to the BTS 130 via the cellular transceiver 250. When the failure is a failure of the power supply 260, the supercap circuitry 270 provides backup power of limited duration for the WR 110. The supercap circuitry 270 stores enough energy to enable the controller 240 to generate a termination message and enable the cellular transceiver 250 to transmit the termination message to the BTS 130. The BTS can then disconnect the wireless communication link 115 with the WR 110. In other embodiments a battery or other alternate power source may be used in place of the supercap circuitry 270.

FIG. 3 illustrates an example flowchart depicting a process that implements the fault detection and notification logic 242. At 310, a fault is detected in the router or power supply 260. If the fault is in the power supply 260 then the controller 240 switches to or utilizes an alternate power source, such as the supercap circuitry 270. Then, at 320, fault information is generated indicating information about the fault, e.g., timestamp, type, or severity of the fault. At 330, a termination message is generated optionally containing the fault information. The cellular transceiver 250 transmits the termination message to the BTS 130. The BTS 130 can now disconnect from the wireless communication link 115. The termination message may be a special message format designed for a cellular data link layer protocol, such as the radio link protocol (RLP) or radio link control (RLC) protocol.

When the BTS 130 receives the termination message and forwards it the service provider's control equipment in the cellular network 140 (FIG. 1), the service provider can distinguish between the temporary loss of connectivity and situations when the WR 110 is temporarily not functioning.

One advantage of the techniques described herein is that the wireless transmission from the WR to the BTS can take place even in the event of a power supply fault or failure, due to the provision of the alternate or back-up power source, e.g., the supercap circuitry. When the alternate power source duration is limited, for example to several hundred milliseconds, the transmission is a final termination message. The mobile network operator and enterprise customer receive quick notification of faults rather than relying on the currently employed timeout method.

The use of a super capacitor can serve as a reasonably reliable and inexpensive means to provide short term back-up power for transmitting the termination message. For example, in code division multiple access (CDMA) and global system for mobile communication (GSM) technologies, the sustained peak current required for a transmission is within 300-400 mA. A 33 µF capacitor can keep a modem powered for tens or even hundreds milliseconds. In order to sustain modem power for 1000 milliseconds (one second), a 400 µF or 800 µF capacitor will suffice. These are not overly large capacitors, and even are available in small "supercap" form factor.

The techniques described herein afford several advantages to wireless wide area (mobile) network operators. Quick notification of the router failure is provided to the mobile network instead of the currently employed timeout method. Upon receiving the termination network, the mobile network equipment, e.g., the BTS, can free up its resources and use them for other mobile clients, thus increasing the cell and the network capacity. Current mobile networks keep or stay allocated to an otherwise dysfunctional wireless router for many hours. Depending on the configuration of the network, the wireless link and the modem can be moved to a "dormant" state for up to two days. In fact, many mobile network operators want to allocate usage of their wireless bandwidth on an as needed or "on-demand" basis to reduce unnecessary network utilization. When the link moves to dormant state, the cell capacity (and power management) is still calculated based on the number of users in the cell. Hence, even if the link between the wireless router and the network equipment is considered aborted, the wireless router user is still counted as using the cell. This has a lot of potential implications, including cell geometry allocation.

Mobile network operators may have strict certification requirements for network equipment, such as wireless routers. In particular, mobile network operators evaluate how connections are terminated. For example, consider an IP connection in a CDMA mobile network. When a connection between a router and packet data servicing node (PDSN) is aborted (physical link down) instead of a graceful or proper termination, the network resources stay allocated and router product operator in this manner would fail certification with such mobile network operators.

The mobile network operator can use the termination message from the wireless router for diagnostic and statistical analysis purposes. As a result, the mobile network operator can better deliver managed network services due to rapid troubleshooting of wireless routers. Moreover, the termination message can be used to provide a clearer demarcation with respect to operator responsibility in the case of a wireless router failure.

Further, the mobile network operator can leverage the capabilities associated with the termination message to delivery primary wireline replacement services. One substantial opportunity for such wireline replacement services is for connectivity to ATM machines, retail kiosks, gas stations, etc. For many of these enterprise customers and managed service providers a wireless connection is insufficient as the only primary connection, because the state of the device can not be always determined. The techniques described herein alleviate these concerns and make wireless router devices more viable solutions for wireline replacement. Thus for a scenario, where a third generation (3G) communication link is used as the primary link to a device such as an ATM, gas station or retail kiosk, the termination message techniques described herein provides a managed service provider or a mobile network operator a reliable way to detect disconnect or service interruption due to either hardware or software problem with the wireless router. In the case of a temporary interruption it is particularly important to release 3G network resources so that they can be re-used for a follow-up connection. One example could be an evolution data only/evolution data optimized (EVDO) network in which the connection can be in a dormant state whereby the wireless router may be powered down. The dormant connection can be kept up in the same state by the network for hours (depending on the dormant timer settings) and unnecessarily utilize network resources.

As for an end user or customer, there are several advantages to the termination message capability described herein. The end use customer is provided with improved visibility to the state of its network elements, and consequently enhanced manageability due to improved troubleshooting capabilities. Also, the termination message can serve to provide quick notification of the wireless router failure to the cellular network and consequently faster service recovery. Further still, many mobile network customers want to pay per network usage (e.g., per kilobyte) as opposed to a flat fee. Thus, it is to the customer's advantage to be disconnected from the mobile network unless the connection is required to exchange data.

The termination message may or may not be the part of a cellular communication technology standard. In one example, the termination message may be implemented with existing signaling messages described in the standards corresponding to the cellular data link protocols such as RLP and RLC. In this case, the cellular modem may terminate the connection by use of the termination message and free up the cellular network resources immediately. However, the existing communication protocols may be enhanced by creating messages with a special format that contain the information about the cause of the failure, which as explained above is advantageous for diagnostic and statistical purposes.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    detecting a fault in a wireless router device that would prohibit access to broadband cellular data services via wireless communications between the wireless router device and a wireless wide area network (WWAN);
    generating a message to cause termination of wireless communication with the WWAN prior to the WWAN terminating wireless communication with the wireless router device based on a timeout; and
    wirelessly transmitting the message from the wireless router device to at least one base transceiver station that is part of the WWAN.

2. The method of claim 1, wherein detecting comprises detecting a power supply fault.

3. The method of claim 2, and further comprising switching to an alternate power source upon detecting the power supply fault.

4. The method of claim 1, wherein detecting comprises detecting a hardware fault.

5. The method of claim 1, wherein detecting comprises detecting a software fault.

6. The method of claim 1 wherein generating comprises generating the message containing information describing the fault.

7. The method of claim 1, and further comprising receiving the message at the at least one base transceiver station and reallocating resources in the wireless wide area network in response thereto.

8. The method of claim 7, and further comprising terminating wireless communications with the router in response to receiving the message.

9. An apparatus comprising:
    a wireline router unit;
    a controller coupled to the wireline router unit and configured to detect a fault that would prohibit access to broadband cellular data services via wireless communications of the router with a wireless wide area network (WWAN), wherein the controller is further configured to generate a termination message to cause termination of wireless communication with the WWAN; and
    a wireless transceiver coupled to the controller that is configured to wirelessly transmit the termination message over the WWAN to at least one base transceiver station of the WWAN;
    wherein the controller is configured to generate the termination message and the wireless transceiver is configured to wirelessly transmit the terminating message prior to the WWAN terminating wireless communication with the router based on a timeout.

10. The apparatus of claim 9, wherein the controller is configured to generate the termination message containing information describing the fault.

11. The apparatus of claim 9, wherein the controller is configured to detect a power supply fault.

12. The apparatus of claim 11, and further comprising an alternate power source, and wherein the controller is configured to switch to the alternate power source upon detecting the power supply fault.

13. The apparatus of claim 9, wherein the controller is configured to detect a hardware fault.

14. The apparatus of claim 9, wherein the controller is configured to detect a software fault.

15. One or more non-transitory computer readable media encoded with computer executable instructions, that when executed, are operable to:
    detect a fault in a wireless router device that would prohibit the wireless router device from having access to broadband cellular data services via wireless communications of the wireless router device with a wireless wide area network (WWAN); and
    generate a message to be transmitted by the wireless router device over the WWAN to cause termination of wireless communication with WWAN when transmitted to and received by a base transceiver station in the WWAN prior to the WWAN terminating wireless communication with the wireless router device based on a timeout.

16. The non-transitory computer readable media of claim 15, wherein the executable instructions operable to detect a fault are configured to detect a power fault.

17. The non-transitory computer readable media of claim 16, and further comprising executable instructions operable to switch to an alternate power source upon detection of the power fault.

18. The non-transitory computer readable media of claim 15, wherein the executable instructions operable to detect a fault are configured to detect a hardware fault.

19. The non-transitory computer readable media of claim 15, wherein the executable instructions operable to detect a fault are configured to detect a software fault.

20. The non-transitory computer readable media of claim 15, wherein the executable instructions operable to generate the message are configured to generate the message containing information describing the fault.

21. The method of claim 3, wherein switching to an alternate power comprises coupling energy stored by a capacitor to a controller in the wireless router device to generate the message and to a wireless transmitter to wirelessly transmit the message.

22. The apparatus of claim 12, and further comprising a capacitor configured to store energy sufficient to power the controller to generate the termination message and to power the wireless transceiver to wirelessly transmit the termination message.

23. The non-transitory computer readable media of claim 16, wherein the executable instructions that are operable to switch comprise instructions that are operable to couple energy stored by a capacitor to a controller in the wireless router device to generate the message and to a wireless transmitter to wirelessly transmit the message.

* * * * *